United States Patent [19]

Kim

[11] Patent Number: 5,498,941
[45] Date of Patent: Mar. 12, 1996

[54] SPEED CONTROL DEVICE USED FOR ELECTRIC AUTOMOBILES AND METHOD THEREFOR

[75] Inventor: Chang-Soo Kim, Seo-Ku, Rep. of Korea

[73] Assignee: Samsung Heavy Industry Co., Ltd., Rep. of Korea

[21] Appl. No.: 323,145

[22] Filed: Oct. 14, 1994

[30] Foreign Application Priority Data

Dec. 22, 1993 [KR] Rep. of Korea ................. 1993-29100

[51] Int. Cl.⁶ ................................................ H02P 3/16
[52] U.S. Cl. ........................................... 318/371; 318/139
[58] Field of Search ..................................... 318/139, 371, 318/372; 188/156; 180/171

[56] References Cited

U.S. PATENT DOCUMENTS

| | | |
|---|---|---|
| 3,621,929 | 11/1971 | Oberthur et al. . |
| 4,225,813 | 9/1980 | Sahasrabudhe . |
| 4,600,865 | 7/1986 | Caputo . |
| 4,712,054 | 12/1987 | Boldt . |
| 5,304,912 | 4/1994 | Kajiwara et al. . |
| 5,340,202 | 8/1994 | Day . |

Primary Examiner—Bentsu Ro
Attorney, Agent, or Firm—Lieberman & Nowak

[57] ABSTRACT

A speed control device automatically controlling the travelling speed of overspeeding electric automobiles so as to allow the automobile to travel safely. The speed control device having a mechanical brake and motor including an input circuit for setting an electric brake request value associated with the RPM (revolution per minute) of the motor, a maximum speed value, an electric brake limit value and a maximum current value of the motor, an RPM sensing circuit for sensing a current RPM of the motor to generate an RPM sensing signal, a current sensing circuit for sensing a current flow in the motor to generate a current sensing signal, and a controller for comparing the input values supplied from the input circuit and the maximum current value with the RPM sensing signal and the current sensing signal to provide a motor driving transistor with a control signal, so that the speed control device performs an electric auxiliary brake function in addition to the mechanical brake function, thereby improving the endurance of the mechanical brake system.

5 Claims, 4 Drawing Sheets

5,498,941

SPEED CONTROL DEVICE USED FOR ELECTRIC AUTOMOBILES AND METHOD THEREFOR

BACKGROUND OF THE INVENTION

The present invention relates generally to a speed control device used for electric automobiles and, more particularly, to a device and method for automatically controlling travelling speeds of electric automobiles travelling at an abnormal speed, i.e., overspeeding, so as to allow the automobiles to travel safely.

Conventionally, electric automobiles do not include speed limiting systems, therefore safety is not guaranteed when the automobile is travelling on a sloped road or at high speed.

Further, since electric automobiles do not have an auxiliary brake system for improving the endurance of the mechanical brake system when braking the automobile, the mechanical brake system easily wears down undesirably.

SUMMARY OF THE INVENTION

It is therefore an object of the present invention to provide a device and method for automatically controlling the travelling speed of electric automobiles when the automobile overspeeds on a sloped road due to poor driving ability of the driver, so as to guarantee safe driving.

It is another object of the present invention to provide a speed control device for electric automobiles capable of improving the endurance of a mechanical brake system and a method therefor.

According to one aspect of the present invention, a speed control device having a mechanical brake and a motor comprises an input circuit for setting an electric brake request value associated with the RPM (revolution per minute) of the motor, a maximum speed value, an electric brake limit value and a maximum current value of the motor; an RPM sensing circuit for sensing the current RPM of the motor to generate an RPM sensing signal; a current sensing circuit for sensing the current flow in the motor to generate the current sensing signal; and a controller for comparing the input values supplied from the input circuit and the maximum current value with the RPM sensing signal and the current sensing signal to provide the motor driving transistor with a control signal, so that the speed control device performs an electric auxiliary brake function in addition to the mechanical brake function, thereby improving the endurance of the mechanical brake system.

BRIEF DESCRIPTION OF THE DRAWINGS

These and other objects, features, and advantages of the present invention are better understood by reading the following detailed description of the invention, taken in conjunction with the accompanying drawings. In the drawings, it should be noted that elements are represented by corresponding symbols or reference numerals, wherein.

DETAILED DESCRIPTION OF THE PREFERRED EMBODIMENT

Figure 1:
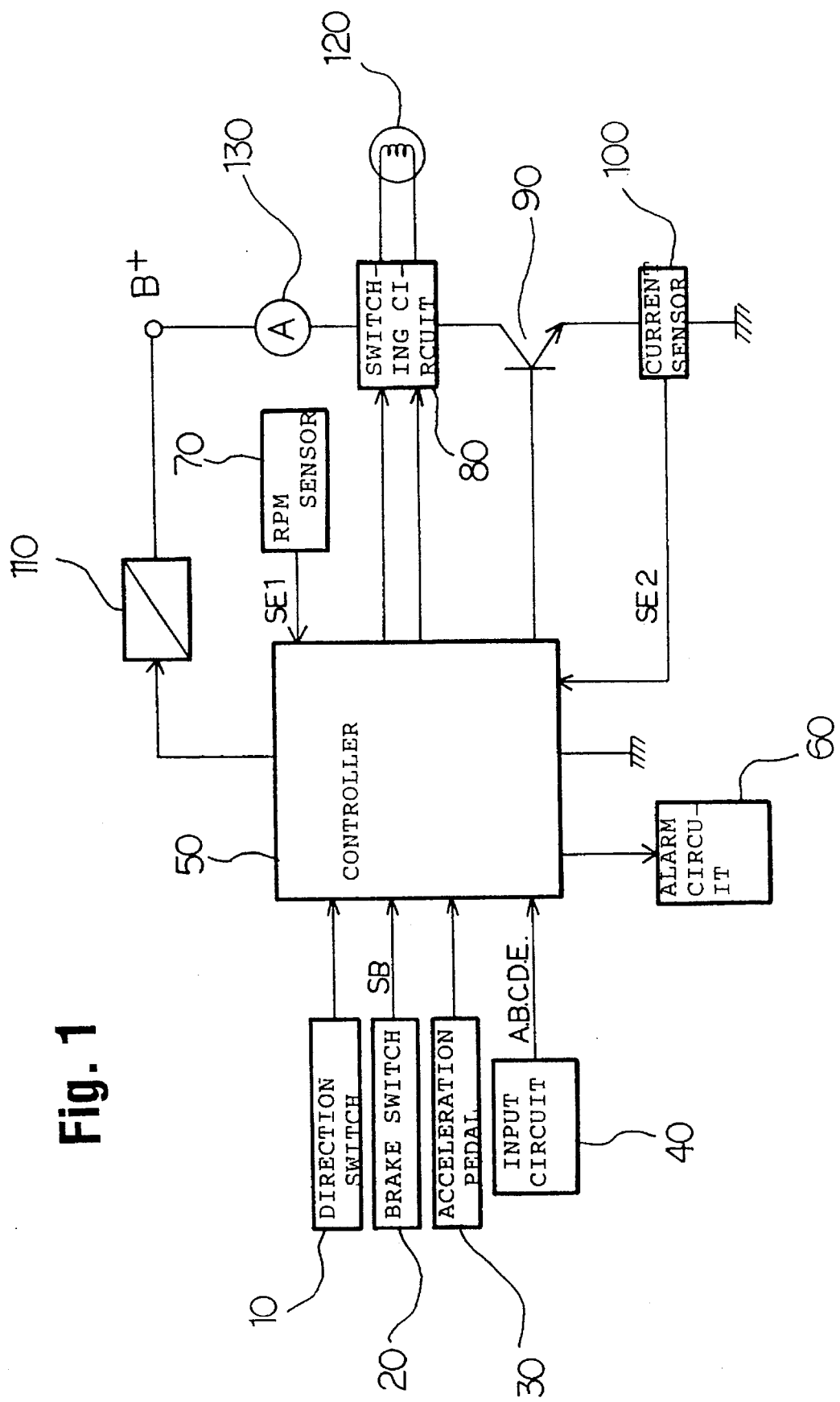
FIG. 1 is a block diagram of a speed control device used for electric automobiles according to the present invention.

Referring to FIG. 1, a speed control device used for electric automobiles according to the present Invention includes a controller 50 comprised of a microcomputer which receives input signals respectively supplied from a direction switch 10, a brake switch 20, an acceleration pedal 30, an input circuit 40, a current sensor 100, and an RPM (revolution per minute) sensor 70. In response to these input signals, the controller 50 provides control signals to an alarm circuit 60, a motor driving transistor 90 for driving a motor 120, a forward-reverse direction switching circuit 80, and a forced brake circuit 110, respectively.

If the automobile driver sets a speed limiting data which is appropriate for safe driving by using the input circuit 40, the controller 50 will execute a speed control processing routine to provide processed resulting data to the motor driving transistor 90 which will control the current flow into the motor 120 for driving the wheels.

In more detail, the controller 50 executes a speed control program in accordance with predetermined values A, B, C, and D from the input circuit 40, preset by the automobile driver, an RPM sensing signal SE1 provided from the RPM sensor 70 for detecting the RPM of the motor 120, and a current sensing signal SE2 provided from the current sensor 100 for detecting the current flow into the ground by way of the motor driving transistor 90. As a result, the controller 50 provides a base electrode of the motor driving transistor 90 with a control signal, so as to allow the automobile to travel at a safe speed.

Further, the controller 50 provides the alarm circuit 60 with a control signal when it is judged that the automobile is travelling at an abnormal speed (i.e., overspeeding), so as to generate an alarm sound for warning the automobile driver that the automobile is travelling at an abnormal speed.

Then, the automobile driver may forcefully brake the automobile by using the brake switch 20. If the brake switch signal SB output from the brake switch 20 is applied to the controller 50, the controller 50 provides the forced brake circuit 110 with a brake control signal to brake the wheels mechanically.

Figure 2A:
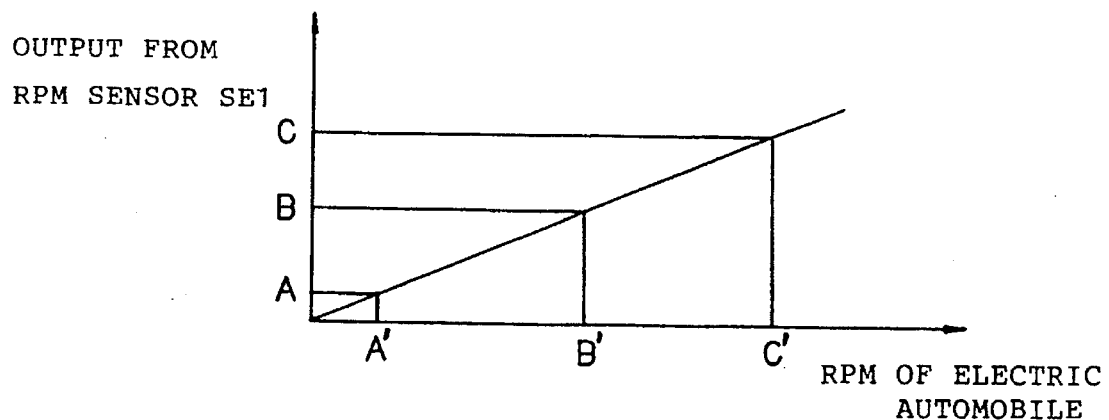
FIG. 2A is a graph illustrating the relationship between the RPM of a motor 120 and the RPM sensing signal output from the RPM sensor 70.
Figure 2B:
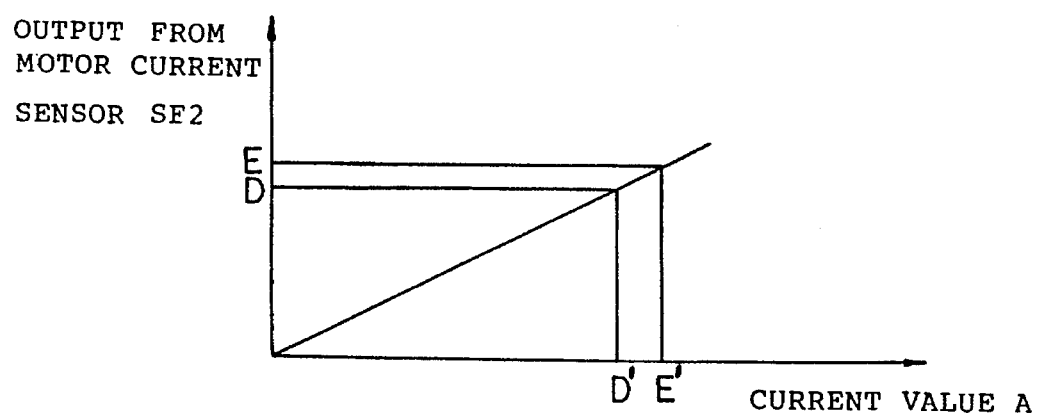
FIG. 2B is a graph illustrating the relationship between the current flow in the motor 120 and the current sensing signal output from the current sensor 100.
Figure 3:
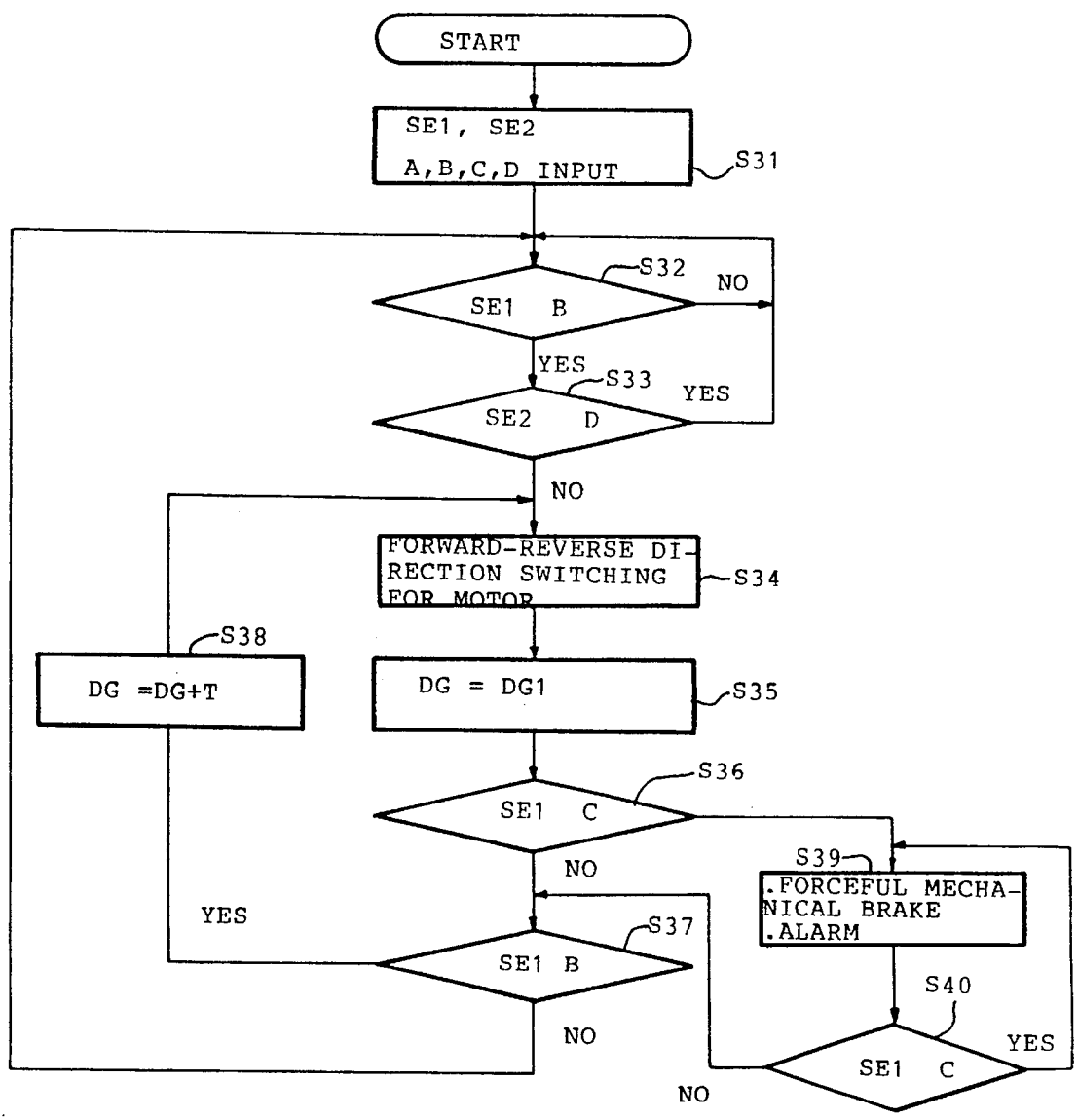
FIG. 3 is a flowchart showing the speed control method according to the present invention.

Referring to FIGS. 2A, 2B and 3, the speed control processing routine performed by the controller 50 will now be explained in detail.

FIG. 2A shows a graph for illustrating the relationship between the RPM of the motor 120 and the RPM sensing signal SE1 from the RPM sensor 70. FIG. 2B shows a graph for illustrating the relationship between the current flow in the motor 120 and the current sensing signal SE2 from the current sensor 100.

In FIG. 2A, a value A (or A') of the RPM sensing signal SE1 represents an electric brake request value indicating that it is necessary for the automobile driver to use an electric auxiliary brake in order to brake the automobile, a value B (or B') represents the maximum speed value set by the driver when the automobile is accelerated at the sloped road, and a value C (or C') represents the electric brake limit value indicating that when a warning sound is generated and the mechanical brake should be forcefully operated, the auxiliary electric brake can not reduce the automobile speed and RPMs are continuing to increase.

In FIG. 2B, a value D (or D') of the current sensing signal SE2 represents the maximum-num current value when the automobile driver drives the vehicle at a high speed intentionally, and a value E (or E') represents the minimum current value for maintaining gradeability of the electric automobile.

The controller 50 compares the preset values A, B, C, and D from the input circuit 40 which are set as shown In FIGS. 2A and 2B with the sensing signals SE1 and SE2 respectively sensed by the RPM sensor 70 and the current sensor 100, in order to generate corresponding control signals.

In FIG. 3, the controller 50 receives the RPM sensing signal SE1 from the RPM sensor 70, the current sensing signal SE2 from the current sensor 100, and the preset values A, B, C, and D from the input circuit 40 (see step S31), and compares the RPM sensing signal SE1 with the value B (see step S32).

In step S32, if the RPM sensing signal SE1 has a value lower than value B, the comparison is executed repeatedly until the RPM sensing signal SE1 has a value higher than value B, therefore advancing to step S33. In step S33, the current sensing signal SE2 is compared with value D. As a result of the comparison, if the current sensing signal SE2 has a value higher than value D, it is judged that the automobile travels at a normal speed, so that the processing routine returns to step S32 to execute the comparison for the new sensing signals SE1 and SE2. Alternatively, if the current sensing signal SE2 has a value lower than value D, it is judged that the automobile is travelling at an abnormal speed (i.e., overspeeding), so that a forward-reverse direction switching signal for the motor 120 is provided to the base electrode of the motor driving transistor 90 in order to operate the electric auxiliary brake.

In this way, as the electric auxiliary brake starts operating, a duty value Dg or a gate driver associated with the automobile speed while the electric auxiliary brake operates is substituted with a value Dg1 determined by the function f(SE1, C) for the detected RPM sensing signal SE1 and the value C, in step S35.

While the electric auxiliary brake continues to operate, the RPM sensing signal SE1 from the RPM sensor 70 is compared with the value C in step S36. If the RPM sensing signal SE1 has a value higher than value C, it is judged that the electric auxiliary brake can not reduce the automobile speed, so that the controller 50 provides the forced brake circuit 110 with the control signal in order to forcefully operate the mechanical brake and at the same time, provides the alarm circuit 60 with the control signal to warn the driver, in step S39. Thereafter, the processing routine advances to the next comparison step S40.

In step S40, similar to step S36, if the RPM sensing signal SE1 has a value higher than value C, step S39 is repeatedly executed; or otherwise, the processing routine advances to step S37.

In step S37, the RPM sensing signal SE1 is compared with value B. If the RPM sensing signal SE1 has a value higher than value B, the processing routine goes to step S38 to substitute the duty value Dg with a value Dg+t (where t represents a minimum duty ratio of the gate driver) and returns to step S34; or otherwise, the processing routine returns to step S32.

In this way, the controller 50 executes the speed control processing routine to reduce the abnormal speed to a safe speed. Namely, since the automobile speed is limited to input value B of FIG. 2A, a safe automobile speed may be maintained even though the slope of the road is steep and the acceleration condition is poor.

Figure 4:
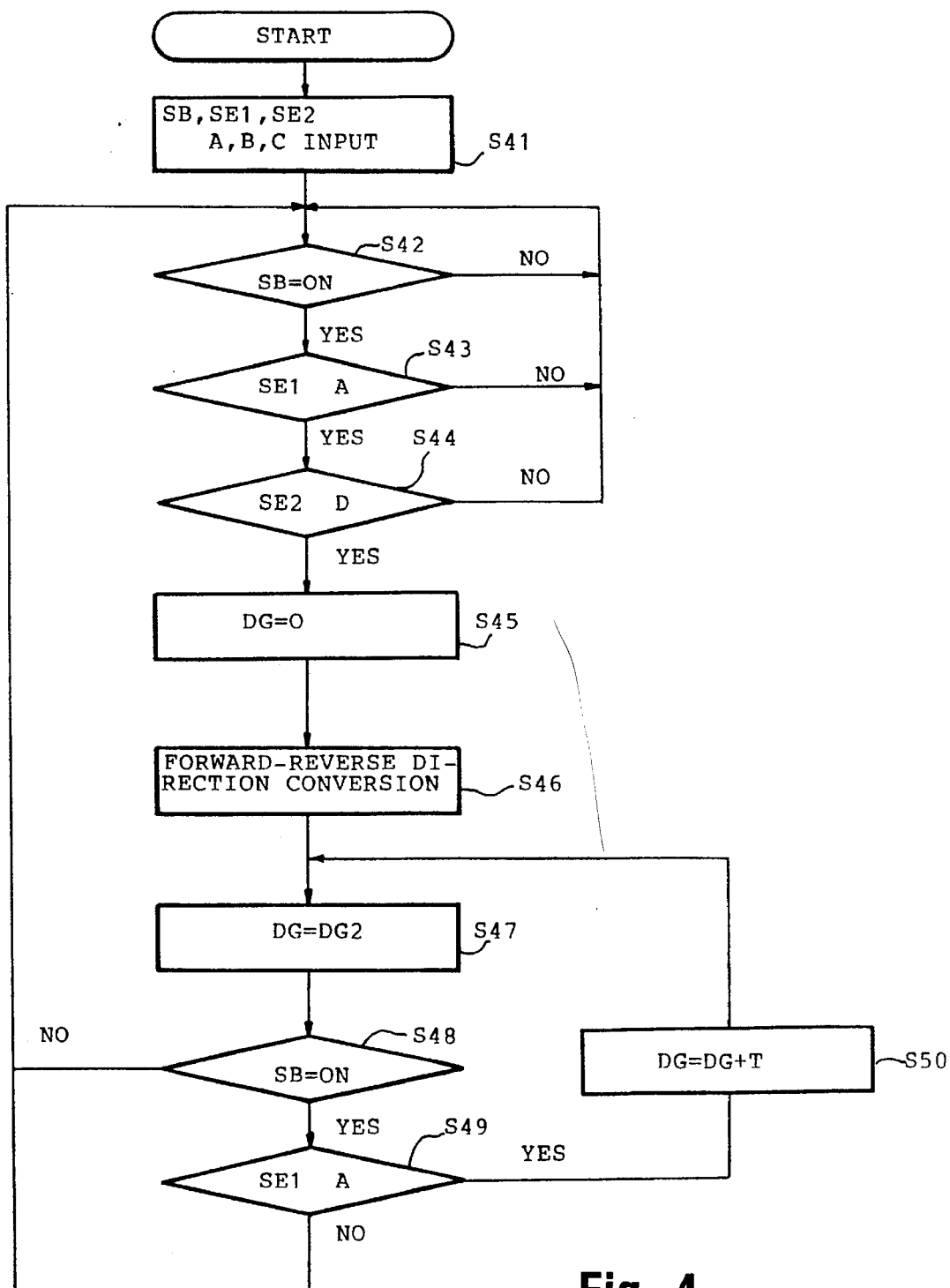
FIG. 4 is a flowchart showing an operating method of an electric auxiliary brake according to the present invention.

Referring to FIG. 4, operation of the electric auxiliary brake will be explained.

In step S41, the controller 50 receives a brake switch signal SB supplied from the brake switch 20, the RPM sensing signal SE1, the current sensing signal SE2, and values A, B and C respectively preset as shown in FIG. 2A.

In steps S42 to S44, it is judged, in sequence, whether the brake switch signal SB is activated ("ON" state), whether the RPM sensing signal SE1 has a value higher than value A, and whether the current sensing signal SE2 has a value higher than value D. If the brake switch signal SB is activated and the RPM sensing signal SE1 has a value higher than value A and the current sensing signal SE2 has a value higher than value D, then the processing routine advances to step S45 to set the duty value Dg to zero.

Thereafter, in step S46, the forward-reverse direction switching for the motor 120 is performed. In step S47, the duty value Dg is substituted with a duty value Dg2=mf(SE1, SE2, A, D). Here, Dg2 is a function of the RPM sensing signal SE1, the current sensing signal SE2, and the values A and D. In step S48, it is judged whether the brake switch signal SB is activated. If the brake switch signal SB is activated, the processing routine advances to step S49 to compare the RPM sensing signal SE1 with value A.

In step S49, if the RPM sensing signal SE1 has a value higher than value A, the processing routine advances to step S50 to set the duty value Dg to Dg+t and returns to step S47.

In summary, such an auxiliary brake operation routine receives the input values preset by the automobile driver and judges whether the brake switch is turned on. If the brake switch is turned on, it is judged whether the automobile speed has reached the electric brake request value A (or A'). If the automobile speed corresponds to a value higher than the electric brake request value A, the electric auxiliary brake starts operating to reduce the current flowing into the motor when the current flowing into the motor exceeds the minimum current value E (or E') for maintaining a gradeability of the electric automobile.

According to this processing routine of the electric auxiliary brake, the vehicle can start without sliding at the sloped road, and operating the electric auxiliary brake would improve the endurance of the mechanical brake.

What is claimed is:

1. A speed control device having a mechanical brake and a motor, comprising:

an input circuit for setting an electric brake request value associated with the RPM (revolution per minute) of said motor, a maximum speed value, an electric brake limit value and a maximum current value of said motor;

an RPM sensing circuit for sensing the current RPM of said motor to generate an RPM sensing signal;

a current sensing circuit for sensing the current flow in said motor to generate a current sensing signal; and a controller for comparing the input values set by said input circuit with said RPM sensing signal and said current sensing signal to provide a motor driving means with a control signal;

whereby said controller performs an electric auxiliary brake in addition to the mechanical brake.

2. A speed control device as claimed in claim 1, wherein said motor driving means comprises a transistor for controlling the current flow into said motor in response to the control signal supplied from said controller.

3. A speed control method for an electric automobile having a mechanical brake and motor, comprising:

a first step for receiving an electric brake request value associated with the RPM of said motor, a maximum speed value, an electric brake limit value, a maximum current value of said motor, an RPM sensing signal of said motor, and a current sensing signal of said motor;

a second step for comparing said RPM sensing signal and said current sensing signal with said maximum speed value and said maximum current value;

a third step for setting a duty value of gate driver to a value according to said RPM sensing signal and said electric brake limit value, if said RPM sensing signal has a value higher than said maximum speed value and said current sensing signal has a value lower than said maximum current value; and a fourth step for comparing said RPM sensing signal with said electric brake limit value so as to drive said mechanical brake if said RPM sensing signal has a value higher than said electric brake limit value.

4. A speed control method for an electric automobile as claimed in claim 3, wherein an alarm sound is generated when said mechanical brake is driven in said fourth step.

5. A speed control method for an electric automobile as claimed in claim 4, further comprising a step for comparing said RPM sensing signal with said maximum speed value, if said RPM sensing signal has a value lower than said maximum speed value then adds a minimum duty value of the gate driver to a current duty value, if said RPM sensing signal has a value higher than said maximum speed value, then reverse the rotation direction of said motor.

* * * * *